Dec. 15, 1964    W. H. GORDON, JR    3,161,806
CONTROL DEVICE AND CIRCUITS FOR ELECTRIC BEDCOVERS
Filed March 6, 1961    2 Sheets-Sheet 1

Inventor:
Walter H. Gordon, Jr.
by Lawrence R. Kempton
His Attorney.

Dec. 15, 1964     W. H. GORDON, JR     3,161,806
CONTROL DEVICE AND CIRCUITS FOR ELECTRIC BEDCOVERS
Filed March 6, 1961     2 Sheets-Sheet 2

Inventor:
Walter H. Gordon, Jr.
by Lawrence R. Kempton
His Attorney.

United States Patent Office 3,161,806
Patented Dec. 15, 1964

3,161,806
CONTROL DEVICE AND CIRCUITS FOR
ELECTRIC BEDCOVERS
Walter H. Gordon, Jr., Asheboro, N.C., assignor to
General Electric Company, a corporation of New York
Filed Mar. 6, 1961, Ser. No. 93,766
7 Claims. (Cl. 317—132)

This invention relates to control devices for electric bedcovers and the like, such as electric blankets, and more particularly relates to an electrical relay and associated circuits for controlling electrically heated bedcovers.

Various circuits are known, in the prior art, which employ one or more relays for maintaining an electric bedcover in operative condition when conditions are normal, and for turning the circuit off in the event of overheating or other malfunctioning of the bedcover or its control circuit. Such circuits generally involve a compromise among various factors, such as cost, reliability, size, and weight.

An object of the present invention is to provide an improved relay in an alternating current control circuit, capable of de-energizing the circuit upon any abnormal operating condition.

Another object is to provide an improved control circuit utilizing a relay sensitive to an alternating electromagnetic flux to open the circuit to a work device.

A further object is to provide an improved arrangement for controlling electric bedcovers, which is relatively less expensive, more reliable, smaller in size, and lighter in weight, than previous arrangements.

In accordance with the illustrated embodiments of this invention, I employ a relay having a yoke, preferably U-shaped, of magnetic material and provided with two windings therearound, an armature arranged at the open or operative end of the yoke and adapted to be actuated in response to magnetic flux in the yoke, and a permanent magnet arranged to provide a fixed magnetic flux between the operative ends of the yoke so as to maintain the relay armature closed in normal operation. The invention further comprises electrical circuits for using the aforesaid relay in an arrangement for controlling a work circuit, such as an electrical bedcover, these circuits having means for providing currents of opposed phase in the two windings of the relay during normal operation so that the net magnetic flux produced by the currents in these two windings does not affect the normally closed condition of the relay, the aforesaid circuits having further means for altering the relative magnitudes of the currents in the two relay windings in the event of an overheat or other malfunction of the electrical bedcover or its control circuit, whereby the relay becomes electrically opened, thereby turning off the control circuit.

The subject matter which I regard as my invention is particularly pointed out and distinctly claimed in the concluding portion of this specification. My invention, however, both as to organization and operation, together with further objects and advantages thereof, will best be understood by reference to the following description taken in connection with the accompanying drawing in which:

Figure 1:
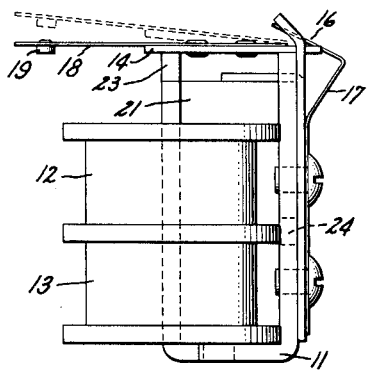
FIG. 1 is a side view of a preferred embodiment of an electrical relay in accordance with the invention.
Figure 3:
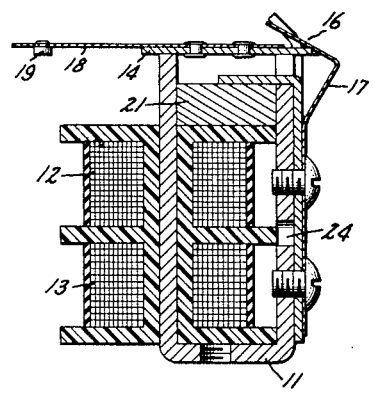
FIG. 3 is a cross-sectional view of the relay, taken on the line 3—3 of FIG. 2.
Figure 2:
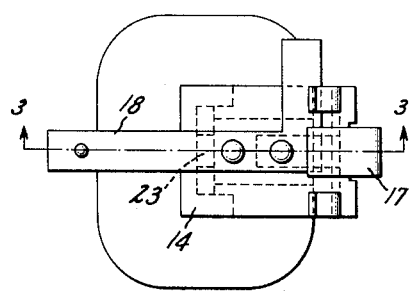
FIG. 2 is a top view of the relay of FIG. 1.
Figure 4:
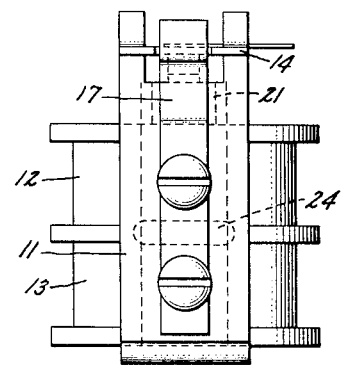
FIG. 4 is an end view of the aforesaid relay.
Figure 5:
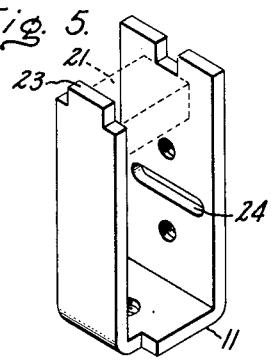
FIG. 5 is a perspective view of the magnetic yoke used in the aforesaid relay.

Now referring to FIGS. 1 through 5, a preferred embodiment of the relay of the present invention comprises a U-shaped core or yoke 11 of magnetic material such as soft iron. The yoke 11 is provided with two windings 12 and 13 positioned therearound, these two windings 12 and 13 preferably being positioned over one of the legs of the U-shaped yoke 11, as shown. An armature 14, of magnetic material such as soft iron, is pivotally attached to one of the legs of the yoke 11, as indicated at 16, and is arranged to be alternatively in a position toward or against the remaining leg of the yoke 11 as indicated by solid lines in FIG. 1, or in a position relatively away from this other leg of the yoke 11, as indicated by dotted lines in FIG. 1. A spring member 17 is arranged to urge the armature 14 to its latter-named position as shown in dotted lines in FIG. 1. A contact arm 18 is attached to the armature 14 and is provided with an electrical contact 19.

A permanent magnet 21 is positioned between the legs of the yoke 11, as shown, with its magnetic poles respectively adjacent the legs of the yoke, so as to provide a fixed magnetic flux at the ends of the yoke, and through the armature for attracting the armature 14 into its downward or "closed" condition as shown by solid lines in FIG. 1. Preferably, the magnet 21 is made of a ferrite material, although other permanent magnet materials can be used. The permanent magnet 21 is arranged to provide sufficient magnetic flux at the ends of the yoke 11 to maintain the armature 14 closed; however, the permanent magnet 21 does not provide sufficient magnetic flux at the ends of the yoke 11 to cause the armature 14 to change from its "open" position, as shown in dotted lines in FIG. 1, to its closed position as shown in solid lines in FIG. 1. The exact strength and positioning of the magnet 21 will, of course, depend upon the relative strength of the spring 17. The relative strength of the spring 17 for urging the armature to its open position, and the magnetic strength of the magnet 21 for urging the armature 14 towards its closed position, may readily be determined by calculation or by experiment. The relay further is provided with a fixed electrical contact 22, shown in FIGS. 6 and 7, which is electrically engaged by the armature contact 19 when the relay is in its closed position.

Preferably, the end of yoke 11 towards which the armature 14 moves, is provided with a shoulder 23 of reduced cross-sectional area (FIG. 5), for the purpose of increasing the magnetic flux density between this pole face and the armature, thereby increasing the magnetic force holding the armature to its closed position and thus permitting the use of a relatively smaller permanent magnet 21 than would otherwise be required. Also, preferably, a transverse slot 24 is provided in the yoke 11, in the leg thereof opposite the leg on which the windings 12 and 13 are positioned. The slot 24 increases the magnetic reluctance and thus causes a reduction in the amount of magnetic flux which passes through the material of the yoke from the permanent magnet 21, thereby causing relatively more of the flux from the magnet 21 to concentrate between the ends of the yoke and through the armature 14. This is a further means to permit the use of a relatively smaller or weaker magnet 21. The transverse slot 24 preferably is located opposite the mutually abutting ends of the windings 12 and 13, as shown.

Figure 6:
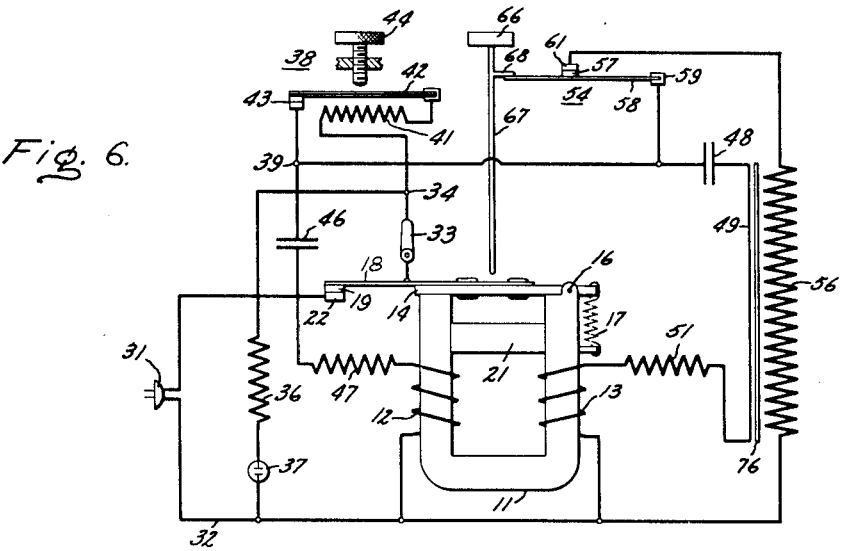
FIG. 6 is a schematic diagram of a preferred electrical circuit using the relay shown in FIGS. 1–5, in which the relay is mechanically closed.

Now referring to the electrical circuit of FIG. 6, a two-prong power plug 31, adapted for connection to a conventional household alternating current outlet, has one prong thereof electrically connected to the fixed contact 22 of the control relay, the other prong of the plug 31 being connected to a connector wire 32. The contact arm 18 of the control relay is connected, via an on-off switch 33, to a point 34. A resistor 36 and neon pilot lamp 37 are connected in series across the power source between the point 34 and the wire 32. An ambient responsive control assembly 38 is connected between the point 34 and another point 39, this control 38 comprising a heater element 41, a thermally responsive strip 42, and a pair of electrical contacts 43, connected in series. The heater 41 is arranged to heat the bimetallic element 42, so as to cause the contacts 43 to turn on and off in a cylic sequence dependent upon ambient or room temperature, in a well known manner. A temperature selection set screw or other suitable adjustment device 44 is arranged to adjust the bimetallic element 42 for the desired cyclic operation.

A capacitor 46, a resistor 47, and the relay winding 12, forming a first relay circuit, are connected in series between the point 39 and the connector wire 32. A capacitor 48, a signal wire 49 of an electrical bedcover, a resistor 51, and the relay winding 13, forming a second relay circuit, are connected electrically in series, also between point 39 and connector wire 32. Thus, these two relaty circuits are in electrical parallel. A reset switch 54 and a heater wire 56 of an electric bedcover are connected electrically in series between the point 39 and the connector wire 32. The reset switch 54 comprises a first electrical contact 57 carried by an arm 58 which is fixedly positioned at an end 59 thereof, the arm 58 being of electrically conductive material and being connected to the point 39. The contact 57 is normally in electrical engagement with a fixed contact 61, which is connected to an end of heater 56. A reset button 66 is attached to a plunger 67 to close mechanically the armature 14 of the control relay when the reset button 66 is manually depressed. The plunger 67 is provided with a projection 68 for moving the arm 58 in a direction to open the electrical contacts 57 and 61 whenever the reset button 66 is depressed, thus providing a safety feature, preventing energization of heater 56 by mechanically jamming or holding push button 66 depressed.

Further details of an electrical bedcover construction utilizing the signal wire 49 and heater wire 56, are disclosed in U.S. Patent Number 2,581,212 issued on January 1, 1952 to D. C. Spooner, Jr. et al. and assigned to the same assignee as the present invention.

The circuit of FIG. 6 functions as follows. The armature 14 of the control relay is initially closed by depression of "on" button 66, upon which the relay remains closed. The armature 14 is held in this closed position by magnetic flux produced by permanent magnet 21. With the on-off switch 33 in its "on" position as shown, current flows from the upper power wire of the plug 31 through the contacts 19 and 22 of the relay, "on" switch 33, the ambient responsive control 38, reset contacts 57 and 61, and the heater wire 56 of the bedcover, to the other wire 32 of the power plug 31. Current thus supplied to heater 56 of the bedcover will cause it to become heated. Current flowing in the ambient responsive heater 41, which is essentially the same current that flows in the bedcover heater wire 56, will, after a while, cause the bimetal element 42 to deflect, thereupon opening the contacts 43 and temporarily suspending the flow of current in the heater wire 56 until the bimetallic element 42 cools sufficiently to cause the contacts 43 to reclose, whereupon another heating cycle occurs. Since the bimetallic element 42 responds to ambient room temperature as well as to heat from the heater 41, the cycling rate will be such that the current in the heater wire 56 will be "off" relatively more of the time when the ambient room temperature is higher, as is well known in the prior art and described in the aforementioned patent.

Whenever current is being supplied to the heater wire 56, current also is supplied to the two relay windings 12 and 13, current being supplied to the winding 12 from the point 39 via the capacitor 46 and resistor 47, and current being supplied to the winding 13 from the point 39 via the capacitor 48, the signal wire 49, and the resistor 51, both of these current circuits being completed to the conductor wire 32. The windings 12 and 13 are wound in opposite directions, or are connected with opposite electrical polarities.

Figure 8:
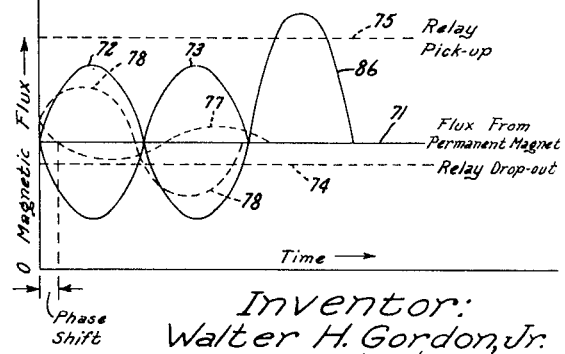
FIG. 8 is a graph illustrating the electrical operation of the relay of FIGS. 1–5 as used in either of the circuits of FIGS. 6 and 7.

FIG. 8 illustrates the relationships of the magnetic fluxes in the relay yoke 11 and armature 14. A fixed magnetic flux, represented by the horizontal line 71 in FIG. 8, is produced by permanent magnet 21. Current in the winding 12 produces an alternating magnetic flux as indicated by the curve 72, and current in the winding 13 produces an alternating flux represented by the curve 73. The magnetic fluxes represented by the curves 72 and 73 are 180° out of phase with respect to each other, due to the aforesaid arrangement of relatively opposite winding directions of the windings 12 and 13, or due to the electrical connections to these windings being made at relatively opposite ends thereof. During normal operation of the control, the two alternating magnetic fluxes 72 and 73 acting upon the relay armature 14 are equal in magnitude and of exactly opposite polarity, thus resulting in a net value of zero magnetic force on the amature 14 insofar as the windings 12 and 13 are concerned. The drop-out magnetic flux value of the relay is indicated by the dotted line 74. During normal operation, the armature 14 remains closed because the flux 71 caused by the permanent magnet 21 has a value greater than the drop-out flux value 74. Neither of the magnetic fluxes 72 and 73 has a maximum value as great as the pull-in flux value 75 of the relay.

Figure 7:
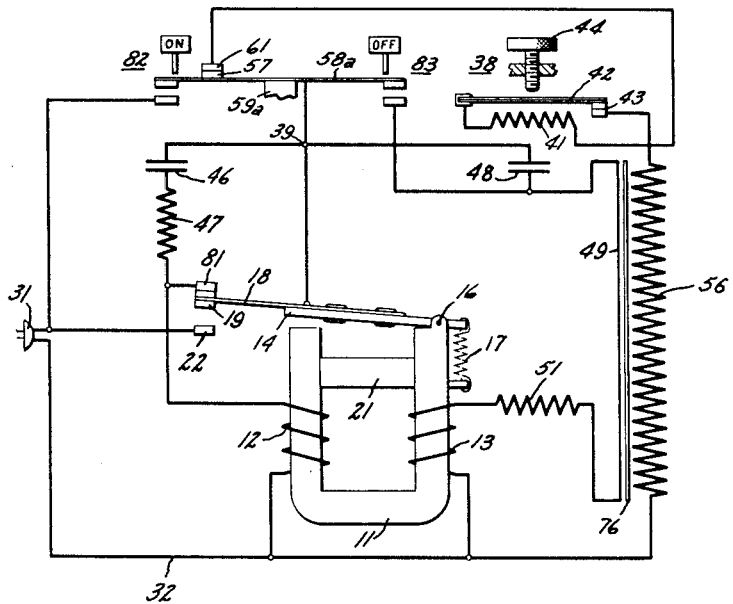
FIG. 7 is a schematic diagram of an alternative electrical circuit using the relay of FIGS. 1–5, in which the relay is electrically closed.

As described in the above-mentioned patent, the signal wire 49 is positioned in closely spaced parallel relationship to the heater wire 56 at all points along the length thereof in the electric bedcover, and is separated therefrom by a layer of normally insulative material 76 represented schematically in FIGS. 6 and 7. This normally insulative layer 76 is made of a material, such as nylon, which is electrically insulative at normal operating temperatures of the electrical bedcover, but which has the characteristic of acquiring a decreased value of electrical impedance if an overheat condition should occur in the electric bedcover. When the impedance of layer 76 changes upon an overheat condition, current flows through the layer 76 between the signal wire 49 and the heater wire 56. When this occurs, the value of magnetic flux 73 produced by the winding 13 changes in magnitude or phase, or both, to produce a net flux between winding 12 and winding 13. When the magnetic flux 73 decreases and changes phase to a value as indicated by the dotted line 77 in FIG. 8, a net magnetic flux is produced at the armature 14 as indicated by the dotted line 78 in FIG. 8. Since the magnetic flux 78 which occurs in the event of an overheat condition, dips below the relay drop-out flux value 74, the armature 14 moves to its open position under the influence of the spring 17, thereby opening the electrical contacts 19, 22 and removing power from the control circuit. Thus, it can be seen that the circuit including winding 13, resistor 51, signal wire 49, and capacitor 48 is essentially a sensing circuit, the output of which is balanced against a parallel reference circuit including winding 12, resistor 47 and capacitor 46. The control circuit will remain in the off condition until the rest button 66 is depressed. While the reset button 66 is depressed, the contacts 61 and 57 open the circuit to the heater wire 56, to prevent operation of the heater in the event that the reset button 66 is jammed or otherwise held in its reset position.

The values of the capacitor 48 and resistor 51 are chosen so that they have equal electrical impedances at the frequency of the alternating current supplied to the power plug 31, thereby causing the voltage across the resistor 51 to be 45° out of phase with respect to the alternating voltage supplied across the heater wire 56. This arrangement results in an approximately constant voltage drop occurring between the signal wire 49 and the heater 56, at all points therealong. The values of capacitor 46 and resistor 47 are chosen to provide a similar 45° lead of current in the relay winding 12, thus causing the magnetic flux relationship shown in FIG. 8 to occur.

The circuit of FIG. 6 provides safety not only by removing power from an electric bedcover in the event of an overheat condition as described above, but also opens the electrical circuit in the event of a break in the signal wire 49, or in the event of a change in the values of either of the resistors 47, 51; either of the capacitors 46, 48; or either of the windings 12, 13. This is due to the fact that a change in value of any of these components will cause an unbalance in the relative magnitudes of the magnetic fluxes 72 and 73, thereby causing the net magnetic relay flux to fall below the drop-out value 74 at some point of the alternating current cycle.

The circuit of FIG. 7 is basically similar to that of FIG. 6, except that the relay may be energized electrically, rather than mechanically. As shown in FIG. 7, a flexible arm 58a is mounted on a support 59a intermediate its ends to provide a normally open "on" switch 82 and a normally open "off" switch 83. Either of these switches can be actuated momentarily by depression of a push button forming a part of the respective switch assembly. In addition, with the circuit arrangement of FIG. 7, a fixed relay contact 81 is provided for engagement by armature contact 19 when the armature is in its open position as shown. With this circuit arrangement, the relay may be electrically energized by momentary depression of the "on" button to close switch 82, thus completing an electrical circuit through switch 82 to point 39, relay contacts 19 and 81, and through relay winding 12 to the other side of the power source. Thus, full line voltage is applied to relay winding 12. As soon as relay armature 14 moves into engagement with a leg of yoke 11, the circuit is broken between contact 19 and contact 81. Thereafter, the relay is maintained in its closed position under normal operating conditions by the magnet 21 as previously described.

As a safety measure, heater 56 is de-energized whenever the manual "on" switch is closed. For this purpose, contacts 57 and 61 are arranged adjacent to switch 82, these contacts being closed when the "on" switch is open as shown in FIG. 7. However, when the "on" switch is depressed, contact 57 is also depressed and moved away from fixed contact 61. When the "on" button is subsequently released, heater 56 can be energized through the ambient responsive control assembly 38 by a circuit commencing with the upper side of the power supply through contacts 22 and 19 to point 39, contacts 57 and 61, the ambient control assembly, and heater 56 to the other side of the line. If it is desired to de-energize the circuit manually, "off" switch 83 is closed by depression of the "off" push button, upon which capacitor 48 is short-circuited and the resulting phase shift and current increase in relay winding 13 causes the relay to drop out.

To summarize, the circuit of FIG. 7 functions to energize the circuit electrically when "on" switch 82 is closed, thereby connecting relay winding 12 directly across the line. The resultant current through relay winding 12 is of sufficient value to generate a momentary magnetic flux between the armature 14 and yoke 11 and of sufficient magnitude to exceed the relay pull-in flux limit 75 shown in FIG. 8. The momentary flux curve has been shown at 86 in FIG. 8 by way of example. As soon as armature 14 closes against yoke 11, the circuit is in its normal operating condition, and it thereafter functions in a manner as previously described in connection with FIG. 6. Thus, any overheat condition or any malfunction of any of the components in the circuit upsets the normal opposed relationship of the flux produced respectively by windings 12 and 13, and such unbalance creates a net flux in the core having at some portion of the cycle an instantaneous value below the relay drop-out limit. Similarly, with the circuit of FIG. 7, the manual "off" switch creates an unbalance between the flux generated by windings 12 and 13. This is accomplished by providing a circuit from point 39 directly through signal wire 49, resistor 51, and relay winding 13, while omitting capacitor 48. This increase in alternating current through winding 13 creates a net flux in core 11 which will have an instantaneous value at one part of the cycle below the relay drop-out level.

Typical causes for the above-mentioned overheating conditions of an electrical bedcover, consist of folding the bedcover or placing other blankets or objects over it so as to cause unduly heated areas thereon. After the cause of overheat is removed, normal operation can be resumed by depressing the reset button (which is the "on" button 82 in FIG. 7). If the condition causing overheat is not corrected, the circuit will repeatedly turn off each time the overheat condition reoccurs.

While I have disclosed preferred embodiments and modifications of the invention, various other embodiments and modifications thereof will occur to those skilled in the art, and will fall within the scope of invention as defined in the following claims.

What I claim as new and desire to secure by Letters Patent of the United States is:

1. A relay comprising a U-shaped yoke, an armature movably positioned across the ends of said yoke, a switch contact movable by said armature, two windings positioned on a first leg of said yoke in side-to-side relationship for producing equal and opposite alternating magnetic flux when said armature is closed against said yoke ends, a permanent magnet positioned between a point on the second leg of said yoke and a point on said first leg of the yoke between the end thereof and said windings, said permanent magnet being polarized to provide a magnetic flux between said yoke and said armature tending to close said armature toward an end of said yoke, and spring biasing means secured to one of said legs and attached to said armature to urge said armature away from said yoke end.

2. A relay as claimed in claim 1, in which said second leg of the yoke is provided with an opening extending transversely therethrough at a point substantially opposite to the mutually adjacent ends of said windings.

3. In an alternating current electrically protective control circuit, a relay having a U-shaped core and an armature movable toward and away from said core between open and closed positions, means biasing said armature away from said core to its open position, a work circuit energized when said armature is engaged against said core in closed position, a permanent magnet associated with said core to provide a magnetic force sufficient to maintain said armature against said core and insufficient to move said armature from open to closed position, a pair of alternating current windings on said core arranged to produce simultaneously equal and opposite alternating magnetic flux while said armature is in the closed position and while operation is normal, an impedance circuit associated with each of said windings, means to modify the value of at least one element in one of said impedance circuits upon an abnormal condition, whereby a net alternating flux is produced in said core to reduce magnetic flux in said core during an alternation to a point at which said biasing means moves said armature to an open position.

4. A circuit as claimed in claim 3, including means to selectively apply a relatively large current to one of said windings thereby to create a sufficiently strong magnetic field between said core and said armature to move said armature to its closed position.

5. In an alternating current over-temperature control system for an electrically heated bedcover or the like including a reference electric circuit and a sensing electric circuit with each circuit presenting similar impedance under normal operating conditions, a circuit controlling relay for the bedcover comprising a core of magnetic material having two legs connected together at one end and open at the other end, a movable circuit controlling armature mounted to bridge said legs at the open ends thereof when in a closed position, a permanent magnet extending between said legs and providing a first magnetic circuit through a portion of each leg and said armature, said magnet providing a sufficient magnetic force in said first magnetic circuit to maintain said armature closed, a pair of windings mounted on said legs, one of said windings being connected in said reference circuit and the other winding being in said sensing circuit, said windings providing a minimum net alternating magnetomotive force under normal operating conditions through a second magnetic circuit including said legs and said armature, a change in the impedance of either said sensing or said reference circuit causing a rise in the amplitude of the net alternating magnetomotive force in said second magnetic circuit to release said armature to an open position when the magnetic force of the permanent magnet is reduced below that force necessary to maintain said armature closed.

6. A circuit as claimed in claim 3, wherein said work circuit includes an electrical heating means, wherein said modifying means includes a signal wire and a material separating said heating means and said signal wire, said material having the characteristic of possessing decreased impedance in response to increased temperature so that a decrease in the resistance of said material causes a reduction in the magnetic flux in said core.

7. The relay claimed in claim 1 wherein said magnet provides a magnetic force sufficient to maintain said armature against said yoke and insufficient to move said armature from an open position to a closed position against the force of said spring biasing means.

References Cited by the Examiner
UNITED STATES PATENTS

| | | | |
|---|---|---|---|
| 2,170,694 | 8/39 | Perry | 317—171 X |
| 2,352,948 | 7/44 | Edgar | 317—172 |
| 2,435,425 | 2/48 | Cunningham | 317—171 |
| 2,768,291 | 10/56 | Lutomirski | 317—155.5 X |
| 2,831,099 | 4/58 | Crowley | 317—132 |
| 2,888,290 | 5/59 | Pierce | 317—171 X |
| 2,903,548 | 9/59 | Mills | 317—132 |
| 2,941,130 | 6/60 | Fischer | 317—171 |

SAMUEL BERNSTEIN, Primary Examiner.

UNITED STATES PATENT OFFICE
CERTIFICATE OF CORRECTION

Patent No. 3,161,806                          December 15, 1964

Walter H. Gordon, Jr.

It is hereby certified that error appears in the above numbered patent requiring correction and that the said Letters Patent should read as corrected below.

Column 3, line 9, after "responsive" insert -- bimetal --; line 25, for "relaty" read -- relay --; column 4, line 27, for "amature" read -- armature --; line 67, for "rest" read -- reset --.

Signed and sealed this 6th day of July 1965.

(SEAL)
Attest:

ERNEST W. SWIDER
Attesting Officer

EDWARD J. BRENNER
Commissioner of Patents